Aug. 31, 1954     A. L. WONG     2,687,716
COMBINATION COOKING AND SERVING UTENSIL
Filed March 12, 1951
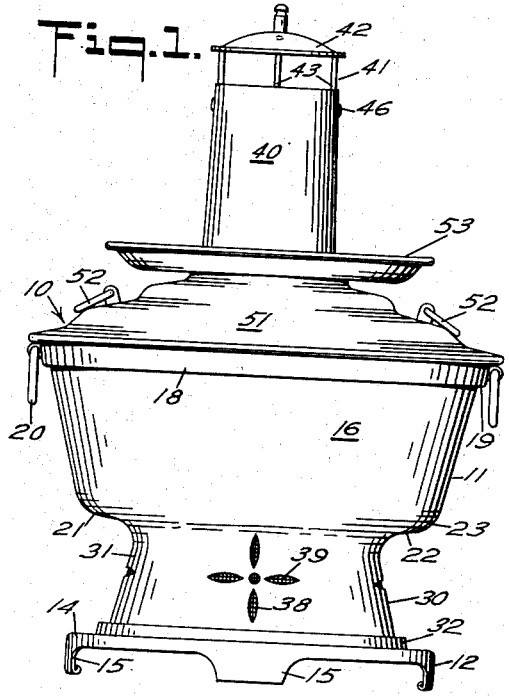
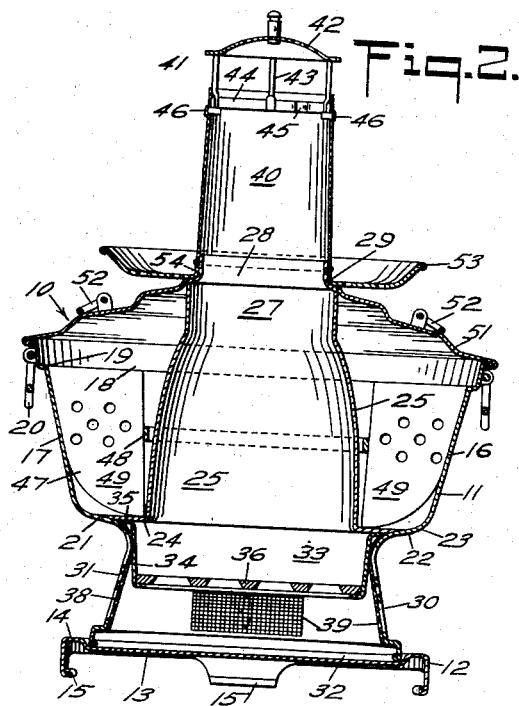
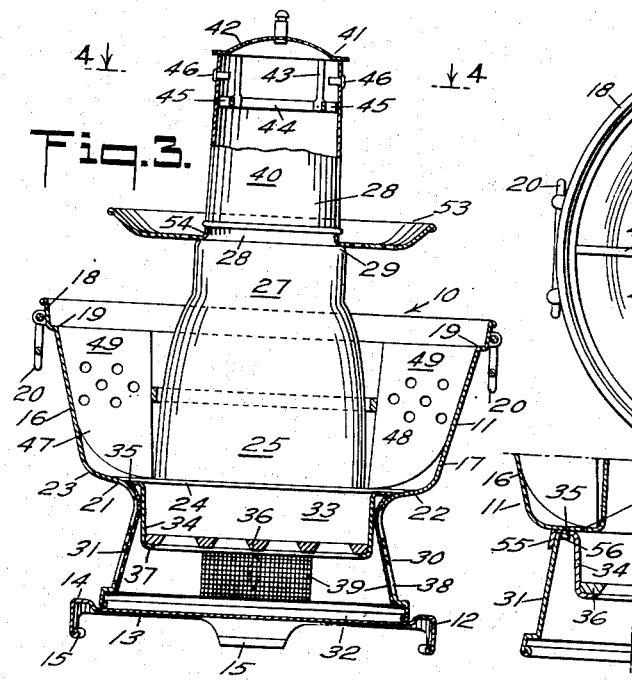
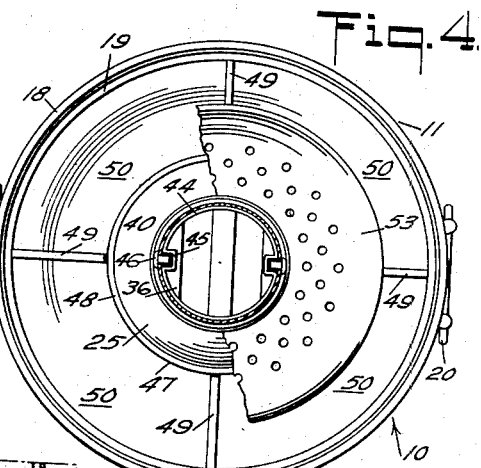
INVENTOR
ALBERT L. WONG
BY
Joseph B. Gardner
ATTORNEY Patented Aug. 31, 1954

2,687,716

UNITED STATES PATENT OFFICE 2,687,716

COMBINATION COOKING AND SERVING UTENSIL

Albert L. Wong, Berkeley, Calif.

Application March 12, 1951, Serial No. 215,174

3 Claims. (Cl. 126—345)

This invention relates in general to apparatus for the preparation of cooked foods and more particularly, to a self-contained utensil especially adapted for the cooking and serving of food at at the dining table.

Before the advent of the modern cooking stoves and ranges when the fireplace served as a source of heat, light and also as the means of heating the family cooking pots there existed in this country a type of cooking which generally involved boiling various foods in the common pot. Such foods were served by ladling out the portions from the cooking pot and after other foods constituting later courses of the meal were placed in the pot to cook as the first portions were consumed.

Similar methods of food preparation have persisted in other sections of the world to the present day. For example, Oriental peoples and particularly the Chinese with their "Sang Wor" cooking kettles, still employ modified forms of this method of cooking.

There are certain very desirable and commendable features to be noted for such a method of food preparation. The food is prepared shortly before consumption and, therefore, flavor and vitamin content is not affected to such an extent as when the food is prepared in some distant kitchen and perhaps held on a warming table until served. If it were possible to provide in the home or in the modern food serving establishment a simple and self contained unit capable of performing the function of this time-honored cooking method, then the many joys and nutritive advantages of such cooking method would also be available to the modern Occidental diner.

No one can deny the most relaxing and warming effects of the glowing embers on the fireplace hearth. In addition, the fragrances arising from a tasty cooking operation have a most stimulating effect on the appetite. In this day of the overtensed citizen, the nervous relaxation and healthful stimulation of jaded appetites, as well as the many desirable nutritive features which might also be provided thereby, would be some of the many advantages to accrue to the modern partaker of the products of such a method of food preparation.

The present invention provides a means whereby this time-honored method of cookery may be made available to the modern diner either for use at the dining table or, appropriately, also in the buffet or serving table style of dining. Such a means comprises in general a compact portable assembly including a charcoal-heated cooking kettle wherein provision is made for the segregation of the materials being cooked and for temporary deposition of food already cooked and awaiting serving. Moreover, provision is made therein for regulating the rate of burning of the charcoal and other advantageous operating features.

Accordingly, it is an object of the invention to provide a self-contained charcoal heated cooking and serving utensil.

Another object of the invention is to provide a charcoal heated cooking utensil in which foods are segregated while cooking in a common liquid substance.

A still further object of the invention is to provide a charcoal heated cooking utensil in which heating control is obtained by regulation of the rate of burning of the charcoal.

Still another object of the invention is to provide a charcoal heated cooking utensil employing a liquid cooking medium and adapted to facilitate the draining and serving of the food cooked therein.

One other object of the invention is to provide, in a charcoal heated cooking utensil, a storage and serving shelf, upon which the food to be served is maintained in a warm condition until served.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to the drawing:

Figure 1 is a side elevational view of the charcoal heated cooking utensil of the invention.

Figure 2 is a vertical sectional view of the apparatus of Figure 1, illustrating internal constructional details of the device.

Figure 3 is a side elevational view partially broken away further illustrating details of the apparatus of Figure 1.

Figure 4 is a plan view seen as below the plane 4—4 of Figure 3.

Figure 5 is a portional sectional view illustrating a somewhat modified form of a part of my apparatus.

With reference to the said drawing, a charcoal heated combination cooking and serving utensil 10, in accordance with the invention, may comprise a cooking utensil assembly 11 resting upon a base 12.

The base 12 may be formed as of a flat circular plate 13 having a raised rim portion 14 encircling the periphery thereof. Suitable supports such as the legs 15 projecting downwardly from the outer marginal edge of the rim 14 may be provided for the base 12, as by folding projecting tabs formed with the raised rim 14 in a downward direction or in any other appropriate fashion.

In general, as may best be seen by reference to Figures 2 and 3 of the drawing, the basic structure of the kettle assembly 11 includes an annularly shaped kettle portion 16 provided with a hollow base means support resting upon the base 12 and having heating means located within the central cavity of the annular kettle 16 and hollow base providing for the burning of charcoal therein. Moreover there is provided partitioning means for said kettle, means to provide for draining and maintaining the warmth of cooked foods together with other advantageous features all of which will be more fully described hereinafter.

More particularly, the outer wall structure of the annular kettle 16 of the kettle assembly 11 may be constructed as an inverted truncated conical wall section 17 the upper marginal edge of which carries a band-like rim 18 forming a shoulder 19 situated therebetween to which rim 18 are attached a pair of handles 20 in diametrically opposed position by means of which handles 20 the kettle assembly 11 may be lifted and moved. A portion 21 of the bottom 22 of the kettle 16 may be provided by deforming inwardly the lower continuation of the section 17 thereby forming the rounded outer bottom corner 23 of said kettle 16. An annular ring 24 attached as by soldering the outer periphery thereof to the inner surface of bottom portion 21 and extending inwardly therefrom serves to complete the kettle bottom 22.

The inner wall structure is preferably constructed as a cylinder 25 joined at the lower end thereof with the inner marginal edge of said annular ring 24 and tapering upwardly to provide a rounded shape terminating in a cylindrical section 27 projecting beyond the rim 18 of the kettle 16. By necking the upper end region of the cylindrical section 27 inwardly there is thereby formed a constricted cylindrical portion 28 joined by the shoulder 29 to the upper terminus of the cylindrical section 27 which is utilized as will be more fully described hereinafter.

Supporting means comprising a hollow base 30 for the kettle 16 may be provided by extending the round portion 21 of the kettle bottom 22 downwards as a truncated conical section 31 terminating in a rolled rim 32 which is adapted to rest upon the plate 13 of the base 12 concentrically disposed and in closed proximity with respect to the raised rim portion 14 thereof. By means of such an arrangement the kettle assembly 11 is securely positioned upon said base 12.

The charcoal heating means may be provided within said hollow base 30 by arranging therein a firebox 33 including a cylindrical firebox wall and grate supporting member 34 supported by a lip 35 projecting outwardly from the upper edge thereof which lip is joined with the annular ring 24 bottom portion of the kettle 16 and a grate 36 resting upon a lip 37 extending inwardly from the lower edge of the cylindrical firebox wall member 34. Ashes falling through the grate are retained by the base 12 and may be removed by lifting the kettle assembly 11. Such an arrangement provides for the combustion of the charcoal within the firebox 33 with the hot combustion gases rising to contact and heat the central wall 25 of the kettle 16 through which the heat is transmitted to materials within the kettle 16. Thereafter the combustion gases rise and pass through the constricted portion 28 of central cylindrical wall 24.

A series of perforations 38 formed in the truncated conical section 31 of the hollow base 30 allow entry of the air required for the combustion of the charcoal. Screens 39 arranged interiorly of the hollow base 30 so as to cover said perforations 38 serve to prevent inadvertent and undesired expulsion of burning material or sparks through the perforations 38 thereby alleviating a possible fire hazard.

Combustion gases emerging from the constructed cylindrical portion 28 of the central kettle wall 25 of the kettle 16 are conducted upwardly by a tapered chimney 40 supported by the constricted portion 28 of the central kettle wall 25 over which it is slip fit so as to abut against the shoulder, 29.

The flow of combustion gas through the chimney 40 and consequently through the whole system may be controlled by a damper means 41 arranged in the upper end of the chimney 40. Such a damper 41 may comprise a cap 42 slightly larger than the upper orifice of the chimney 30 and supported by attachment with rods 43 extending downwardly and joined with a ring member 44 which slidably engages the interior surface of the upper end of the chimney 40.

In order that the damper 41 may be supported in the open raised position, the ring member 44 is folded at diametrically opposed positions to provide notches 45 in the periphery thereof. Also a pair of rivets 46 projecting inwardly of the chimney 40 are arranged so that the lower edge of the ring 44 rests thereon thereby maintaining the damper 41 in an open position and spaced in a manner corresponding to that of said notches 45 so that upon rotation of the damper 41 said notches 45 are brought into mating position with respect to the projecting rivets 46 and the damper may then be lowered to close off the draft.

Segregation of the various foods during cooking may be accomplished by providing a removable partition member 47 formed as of a ring member 48 encircling and slidably engaging the central kettle wall 25 to which ring 48 there may be attached an appropriate number of perforated fins 49 having a planar area similar to the cross-section of the annular kettle 16, and arranged to substantially segregate interior portions 50 of the annular kettle.

An annular cover 51 may be provided for the kettle 16 which cover 51 is formed so as to rest on the rim 18 and extends over the open top of the kettle 16 to slidably engage the surface of the central cylindrical kettle wall 25. To afford easy manipulation of the cover 51 there may be provided on the upper surface thereof a pair of diametrically opposed handles 52.

A draining and storing tray 53 formed as an annular trough having perforations formed in the lower portion thereof and adapted to be supported by the shoulder 29 of the central cylindrical kettle wall 25 by having the inner marginal edge thereof formed as a ringlike lip 54 extending upwardly and adapted to rest upon said shoulder 29. The tray 53 is positioned by removing the chimney 40 and the cover 51 and then adjusting the tray 53 so that the ringlike lip 54 engages the shoulder 29 which tray 53 may then be locked in place by replacing the chimney 40. In this manner the drippings from the tray 53 fall back into the kettle and the tray and food placed thereon is kept warm by the heated air emerging from the kettle 16 and by conduction from the heated central wall 25.

A modification of the utensil assembly 11 which possesses certain advantageous features may be made as illustrated in Figure 5 of the drawing.

As shown therein the kettle portion 16 may be constructed as an independent unit resting upon the hollow base 30 as will be described more fully below. With this manner of construction, the kettle portion 16 may be more simply constructed of either drawn or spun metal elements forged or welded together.

As may be seen from the said Figure 5 such an arrangement is achieved by separating the kettle 16 from the hollow base 30 and by affixing a truncated conically shaped positioning ring 55 to the central portion of the exterior wall of kettle bottom 22 and slanting outwardly therefrom of suitable dimensions to slidably engage the upper exterior portions of wall section 31. Also the upper end of the truncated conical wall section 31 of the base 30 is provided with an inwardly projecting lip-like flange portion 56 upon which the lip 35 of the grate supporting member 34 may rest. The inner portion bottom 22 then rests upon this lip 35 of grate supporting member 34.

In use a liquid medium such as a broth stock is placed in the kettle 16, then, with glowing charcoal heating the kettle, various foods such as choice portions of fresh frozen meats, fish or seafoods and various vegetables and other viands are placed in the segregated portions of the kettle, seasoned to taste and rapidly cooked with the cover in place. For serving the chimney and cover for the kettle are removed, the serving tray placed in position and the chimney replaced. Foods may then be ladled onto the tray where they drain and are maintained in a warm condition until selected by the diner.

The structural arrangement of the utensil provides a particularly advantageous method of heating the kettle as the heat is mainly applied to the central cylindrical kettle wall, a simmering boil is produced which causes a positive rolling movement of the liquid cooking medium and is desirable to rapidly cook the food. Also by such heating there is little tendency for the solid food particles to burn and stick to the bottom of the pan.

From the esthetic point of view, a very satisfactory sensation of heat and comfort is produced by the sight of the glowing charcoal reflected through the perforations in the base, the flavorful cooking odors, and the slightly smoky odor of the burning charcoal.

Also the structural arrangement provides easy disassembly for cleaning purposes and encourages adequate cleaning for sanitary purposes. Preferably the utensil is constructed of a non-corrosive metal such as brass, copper or stainless steel.

I claim:

1. A combination cooking and serving utensil for food products comprising a horizontally disposed base member, an annular cooking kettle overlying said base member and having a cylindrical depending section engageable with an upper portion of said base for supporting said kettle in superimposed relation to said base, heating means within said cylindrical section intermediate said kettle and base, a chimney extending from said heating means through the central opening in said kettle and having an upper end portion disposed above the upper edge portion of said kettle, an annular kettle cover slidably engageable with said chimney and axially movable therealong, an annular food draining and storing tray slidably engaged with said chimney, means on said cover limiting axial movement of said tray, and means on said chimney independent of said cover means for limiting axial movement of said tray.

2. Apparatus as set forth in claim 1 in which the periphery of said tray is smaller than that of said kettle.

3. A combination cooking and serving utensil for food products comprising a horizontally disposed base member, an annular cooking kettle overlying said base member and having a cylindrical depending section engageable with an upper portion of said base for supporting said kettle in superimposed relation to said base, partition means disposed within said kettle member, a fire box within said cylindrical section intermediate said kettle and said base, means defining a plurality of air apertures in said cylindrical section adjacent said fire box, a chimney extending from said fire box through the central opening in said kettle and having an upper end portion disposed above the upper edge portion of said kettle, damper means in said chimney adjacent the upper end portion thereof, an annular kettle cover slidably engaged with said chimney and movable along the axis thereof, an annular food draining and storing tray slidably engaged with said chimney for longitudinal movement therealong, said tray being removable from the upper end of the chimney, means on said cover limiting the downward axial movement of said tray, and means on said chimney independent of said cover means for limiting downward axial movement of said tray in a second position of axial adjustment.

References Cited in the file of this patent

UNITED STATES PATENTS

| Number | Name | Date |
| --- | --- | --- |
| 166,120 | Malin | July 27, 1875 |
| 170,921 | Viehmeyer | Dec. 7, 1875 |
| 194,385 | Tanenbaum | Aug. 21, 1877 |
| 665,658 | Jankus | Jan. 8, 1901 |
| 1,089,164 | Szunyik | Mar. 3, 1914 |
| 1,478,729 | Brown | Dec. 25, 1923 |

FOREIGN PATENTS

| Number | Country | Date |
| --- | --- | --- |
| 19,953 | Great Britain | of 1903 |
| 26,616 | Australia | Apr. 28, 1931 |
| 459,855 | Great Britain | Jan. 13, 1937 |